United States Patent
Liu et al.

(10) Patent No.: US 9,046,758 B2
(45) Date of Patent: Jun. 2, 2015

(54) OMNIDIRECTIONAL-VIEW THREE-DIMENSIONAL DISPLAY APPARATUS

(75) Inventors: Xu Liu, Hangzhou (CN); Xinxing Xia, Hangzhou (CN); Haifeng Li, Hangzhou (CN); Caijie Yan, Hangzhou (CN)

(73) Assignee: ZHEJIANG UNIVERSITY, Hangzhou, Zhejiang Province (CN)

( * ) Notice: Subject to any disclaimer, the term of this patent is extended or adjusted under 35 U.S.C. 154(b) by 618 days.

(21) Appl. No.: 13/390,860

(22) PCT Filed: Mar. 17, 2010

(86) PCT No.: PCT/CN2010/071088
§ 371 (c)(1),
(2), (4) Date: Feb. 16, 2012

(87) PCT Pub. No.: WO2011/020321
PCT Pub. Date: Feb. 24, 2011

(65) Prior Publication Data
US 2012/0147003 A1   Jun. 14, 2012

(30) Foreign Application Priority Data

Aug. 17, 2009  (CN) .......................... 2009 1 0102154
Jan. 8, 2010    (CN) .......................... 2010 1 0039604

(51) Int. Cl.
*G03B 21/00*  (2006.01)
*G03B 37/00*  (2006.01)
(Continued)

(52) U.S. Cl.
CPC .............. *G03B 37/00* (2013.01); *G02B 5/0252* (2013.01); *G02B 5/0278* (2013.01);
(Continued)

(58) Field of Classification Search
CPC ........... G02B 27/22; G09B 3/00; H04N 13/00
USPC .......................................... 353/8, 7; 345/419
See application file for complete search history.

(56) References Cited

U.S. PATENT DOCUMENTS

| | | | | |
|---|---|---|---|---|
| 5,148,310 A | * | 9/1992 | Batchko | 359/479 |
| 2005/0180007 A1 | * | 8/2005 | Cossairt et al. | 359/465 |

(Continued)

FOREIGN PATENT DOCUMENTS

| | | | |
|---|---|---|---|
| CN | 101021669 A | 8/2007 | |
| CN | 200710177827 | * 11/2007 | G03B 21/28 |

(Continued)

OTHER PUBLICATIONS

Zheng, Huadong, et al., A review on three dimensional display techniques; Optical Technique; 2008, vol. 34, No. 3, pp. 426-430.
(Continued)

*Primary Examiner* — William C Dowling
*Assistant Examiner* — Jerry Brooks
(74) *Attorney, Agent, or Firm* — Jacobson Holman PLLC; Jiwen Chen

(57) ABSTRACT

An omnidirectional-view three-dimensional display apparatus comprises a high-frame-rate projector (21), a rotatable reflector device and a cylindrical transmissive selective-diffusing screen (24). The optical axis of the high-frame-rate projector (21) is coincident with the rotating axis of the reflector device and the axis of the cylindrical selective-diffusing screen (24). The images projected by the high-frame-rate projector (21) are reflected by the reflector device to form images on the cylindrical transmissive selective-diffusing screen (24). The cylindrical transmissive selective-diffusing screen (24) can control the diffusing angle of the emergence ray, so that the left eye and the right eye of an observer can see a three-dimensional object's images in different view angles to achieve an omnidirectional-view three-dimensional display. The omnidirectional-view three-dimensional display apparatus based on the high-frame-rate projector (21) enables the eyes of observers to watch images with binocular parallax at different positions, so as to achieve three-dimensional display.

13 Claims, 13 Drawing Sheets

(51) Int. Cl.
*G02B 5/02* (2006.01)
*G02B 27/22* (2006.01)
*G03B 21/10* (2006.01)
*G03B 35/18* (2006.01)
*H04N 13/04* (2006.01)

(52) U.S. Cl.
CPC ........... *G02B 27/2285* (2013.01); *G03B 21/10* (2013.01); *G03B 35/18* (2013.01); *H04N 13/0402* (2013.01); *H04N 13/0445* (2013.01); *H04N 13/0459* (2013.01)

(56) References Cited

U.S. PATENT DOCUMENTS

| | | | |
|---|---|---|---|
| 2005/0219473 A1* | 10/2005 | Moriyama et al. | 353/79 |
| 2006/0171008 A1 | 8/2006 | Mintz et al. | |
| 2007/0058229 A1 | 3/2007 | Hudyma et al. | |
| 2007/0242237 A1* | 10/2007 | Thomas | 353/94 |

FOREIGN PATENT DOCUMENTS

| | | |
|---|---|---|
| CN | 101183208 A | 5/2008 |
| CN | 201110911 Y | 9/2008 |
| CN | 101281298 A | 10/2008 |
| CN | 101339309 A | 1/2009 |
| CN | 101344713 A | 1/2009 |
| CN | 101511036 A | 8/2009 |
| JP | 2003-344962 A | 12/2003 |
| JP | 2005-275398 A | 10/2005 |

OTHER PUBLICATIONS

Lin, Yuanfang, et, Principle and distortion analysis for reconstructing 3-D image with a rotating display panel, Opto-Electronic Engineering, 2004, vol. 31, No. 5, pp. 64-67.

Xiao, Xiao, et. A present and development of panoramic imaging technique, Optical Instruments, 2007, vol. 29, No. 4, pp. 84-89.

* cited by examiner

OMNIDIRECTIONAL-VIEW THREE-DIMENSIONAL DISPLAY APPARATUS

This is a U.S. national stage application of PCT Application No. PCT/CN2010/071088 under 35 U.S.C. 371, filed Mar. 17, 2010 in Chinese, claiming the priority benefits of Chinese Application No. 200910102154.0, filed Aug. 17, 2009, and Chinese Application No. 201010039604.9, filed Jan. 8, 2010, which are hereby incorporated by reference.

FIELD OF THE INVENTION

This invention relates to a display device, particularly to an omnidirectional-view three-dimensional display apparatus.

BACKGROUND OF THE INVENTION

Three-dimensional stereo perception is produced on the basis of multiple depth cues, mainly including binocular disparity, motion parallax and accommodation. Those optical devices that are able to generate binocular disparity on human eyes can produce three-dimensional stereo vision. Three-dimensional display technology is in wide use, and has a bright prospect in a variety of fields, including medicine, geospatial intelligence, oil exploration, pharmaceutical manufacturing, construction, movie and television entertainment, video communication, science presentation, commodity advertisements, etc.

Currently, three-dimensional display technologies mainly include stereoscopic three-dimensional display, autostereoscopic three-dimensional display, holographic three-dimensional display and volumetric three-dimensional display.

The implementation of stereoscopic three-dimensional display requires the visual aids like glasses, which enable the observer to see images with binocular disparity, thus generating stereo vision. Today, this method mainly includes complementary colors or polarizations, which are widely applied to 3D films and other fields. However, this method requires the assistance of external tools to achieve, and 360° view is not achievable. Long-time watching may cause visual fatigue and other symptoms to people's eyes.

Autostereoscopic display is a three-dimensional display technology, which enable the observer to see images with binocular disparity but without the help of external tools. This method mostly adopts parallax slit and other means to enable observers to watch at certain areas with naked eyes to perceive three-dimensional vision.

Holographic three-dimensional display is implemented based on the principle of "interference records and diffraction reappears". Holographic three-dimensional display records all vibration amplitude and phase information of object light waves. Thus, it is an ideal way for three-dimensional display. However, this method demands enormous data storage and information transformation. Dynamic holographic display has not been achieved yet because of the technological limitation.

Volumetric three-dimensional display is realized by controlling brightness of each voxel scattered in the volume space. Swept volume three-dimensional display scans the three-dimensional profile of the objects in the volume space through volume sweep/scanning and achieves three-dimensional display of the objects as a result of persistence-of-vision effect. This method provides both horizontal and vertical parallax, allowing for horizontal 360° round-viewing, which is suitable for multiple people to watch by naked eyes. However, volumetric three-dimensional display has the characteristics of non-occlusion, i.e., the occluding relation between two objects in the volume space, where one object is in front of or blocks the view of the other object, cannot be displayed. Thus, this method can only display transparent objects, but cannot achieve perspective occlusion of objects in a volume space.

Based on the above analysis on current three-dimensional display technologies, improvements are in urgent demand in this field.

SUMMARY OF THE INVENTION

This invention is to solve the technical problem of creating an omnidirectional-view three-dimensional display.

TECHNICAL SOLUTION

To address the above problem, this invention provides an omnidirectional-view three-dimensional display apparatus, comprising: a high-frame-rate projector, a rotatable reflector device and a cylindrical transmissive selective-diffusing screen, and the optical axis of the high-frame-rate projector is coincident with the rotating axis of the reflector device and the axis of the cylindrical transmissive selective-diffusing screen. The images projected by the high-frame-rate projector are reflected by the reflector device to form images on the cylindrical transmissive selective-diffusing screen.

Optionally, the reflector device can be installed inside the cylindrical transmissive selective-diffusing screen.

Optionally, a rotary actuator for driving the reflector device and an upper computer are included as well. The rotary actuator also includes a sensor for detecting the rotary status of the reflector device, a synchronous detection module. And the sensor, the synchronous detection module, the upper computer and the high-frame-rate projector are sequentially in electrical connection.

Optionally, the rotary actuator can be installed inside the cylindrical transmissive selective-diffusing screen.

Optionally, the reflector device may contain at least two groups of reflecting surfaces, which divide the images projected by the high-frame-rate projector.

Optionally, the various reflecting surfaces project the divided images on the cylindrical transmissive selective-diffusing screen, and the divided images are free of radial and/or axial superposition on the cylindrical transmissive selective-diffusing screen.

Optionally, the divided images are connected in radial and/or axial direction on the cylindrical transmissive selective-diffusing screen.

Optionally, at least two sets of high-frame-rate projectors and reflector devices are arranged along the axial direction of the cylindrical transmissive selective-diffusing screen, and images projected by different high-frame-rate projectors may be free of radial and/or axial superposition on the cylindrical transmissive selective-diffusing screen.

Optionally, images projected by different high-frame-rate projectors can be connected in radial and/or axial direction on the cylindrical transmissive selective-diffusing screen.

Optionally, the cylindrical transmissive selective-diffusing screen may be a transmissive holographic selective-diffusing screen, a binary optical element or an optical element with grating structure.

Optionally, the radial cross-section of the cylindrical transmissive selective-diffusing screen is in the shapes of a circle, a triangle, a quadrilateral or a polygon.

Advantages of the Invention

Compared with the prior art, the reflector device on the light path between the high-frame-rate projector and the cylindrical transmissive selective-diffusing screen is set on a rotatable form in this invention. Thus, the rotation of the reflector device produces the omnidirectional-view three-dimensional display formed on the cylindrical transmissive selective-diffusing screen by the high-frame-rate projector. The omnidirectional-view three-dimensional display not only accomplishes 360° viewing by multiple people with naked eyes, but also overcomes the drawback of non-occlusion in volumetric three-dimensional display. The increase of the viewing angles enhances the display effect and subtleness of the image.

Moreover, the omnidirectional-view three-dimensional display apparatus further includes: a rotary actuator to drive the reflector device, and an upper computer. The rotary actuator contains a sensor for detecting the rotary status of the reflector device, and a synchronous detection module to synchronize the reflector device and the high-frame-rate projector, and display various images at different positions on the cylindrical transmissive selective-diffusing screen.

Furthermore, the reflector device is equipped with a plurality of reflecting surfaces groups. Different reflecting surfaces groups project divided images on the cylindrical transmissive selective-diffusing screen, wherein the divided images are free of radial and/or axial superposition on the cylindrical transmissive selective-diffusing screen, and then the divided images are connected in radial and/or axial direction on the cylindrical transmissive selective-diffusing screen. As a result, the omnidirectional-view three-dimensional display apparatus simultaneously having the horizontal all-round and multiple top/bottom vertical views is established.

Similarly, at least two sets of high-frame-rate projectors and reflector devices are arranged along the axial direction of the cylindrical transmissive selective-diffusing screen, and images projected by different high-frame-rate projectors are free of radial and/or axial superposition on the cylindrical transmissive selective-diffusing screen, also leading to the omnidirectional-view three-dimensional display apparatus simultaneously having the horizontal all round and multiple top/bottom vertical views.

PREFERRED EMBODIMENT OF THE INVENTION

The omnidirectional-view three-dimensional display refers to displaying various view images of a three-dimensional object on the screen from different viewing angles, and achieving one circle 360° view via the rotation of system elements. As a result of the limitations on emitting angles for each view image, each view can be observed only at a corresponding view position to ensure the sight of different view images by left and right eyes and this produces the three-dimensional vision of an observer. This method implements omnidirectional-view three-dimensional display with occlusion, which can be viewed with naked eyes from horizontally 360° around by multiple people.

Figure 1:
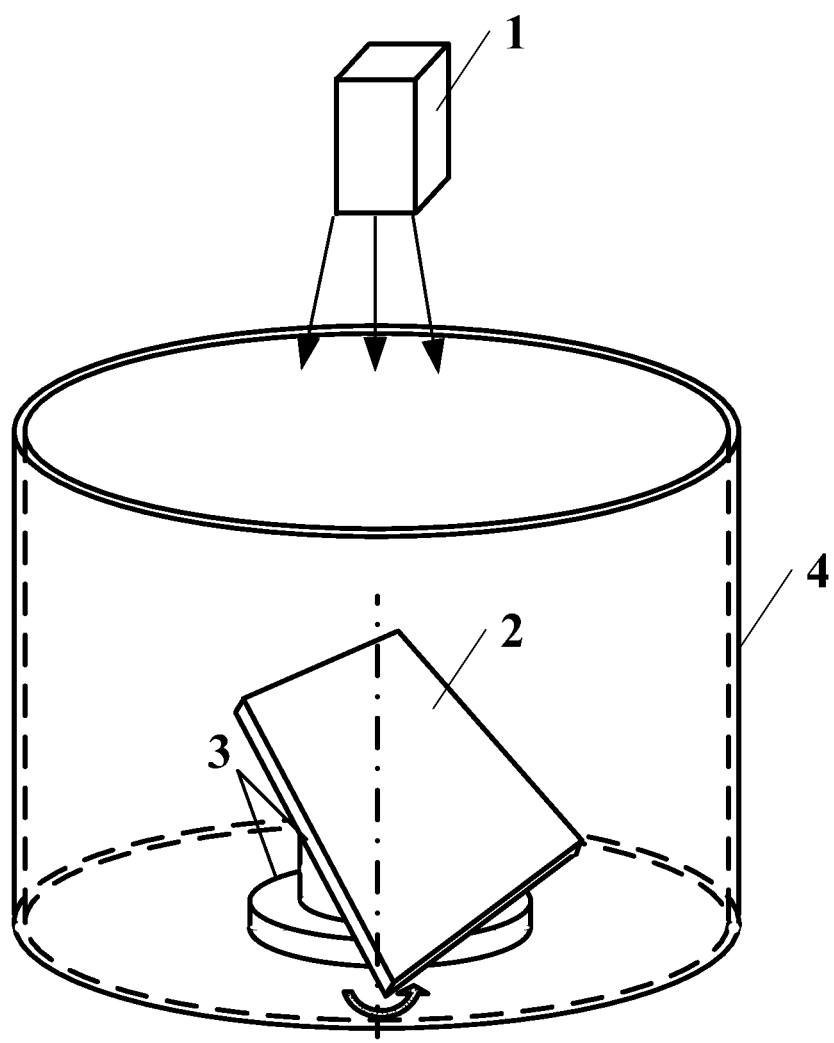
FIG. 1 is an illustration of 3D display schematic of the omnidirectional-view three-dimensional display apparatus in an embodiment according to this invention.

As shown in FIG. 1, an omnidirectional-view three-dimensional display apparatus based on a high-frame-rate projector is provided according to one embodiment of this invention. The apparatus mainly comprises a fixed high-frame-rate projector 1 and a circular cylindrical transmissive selective-diffusing screen 4, and the rotary part is a first reflector system 2 which is attached to a rotary actuator 3 and rotates with it. The optical axis of the high-frame-rate projector 1 is coincident with the rotating axis of the rotary actuator 3 and the axis of the circular cylindrical transmissive selective-diffusing screen 4. The images projected by the high-frame-rate projector 1 are reflected by the first reflector system 2 to form images on the circular cylindrical transmissive selective-diffusing screen 4. The fixed circular cylindrical transmissive selective-diffusing screen 4 not only acts as the display screen to implement the omnidirectional-view three-dimensional display by limiting the divergence angle of emergent light, but also serves as the protective housing of the rotating first reflector system 2, to reduce the wind resistance and wind noise arising from the rotary parts and make the rotation more stable. Therefore, the whole display system is more suitable for close viewing by many people.

Embodiments of the Invention

Figure 2:
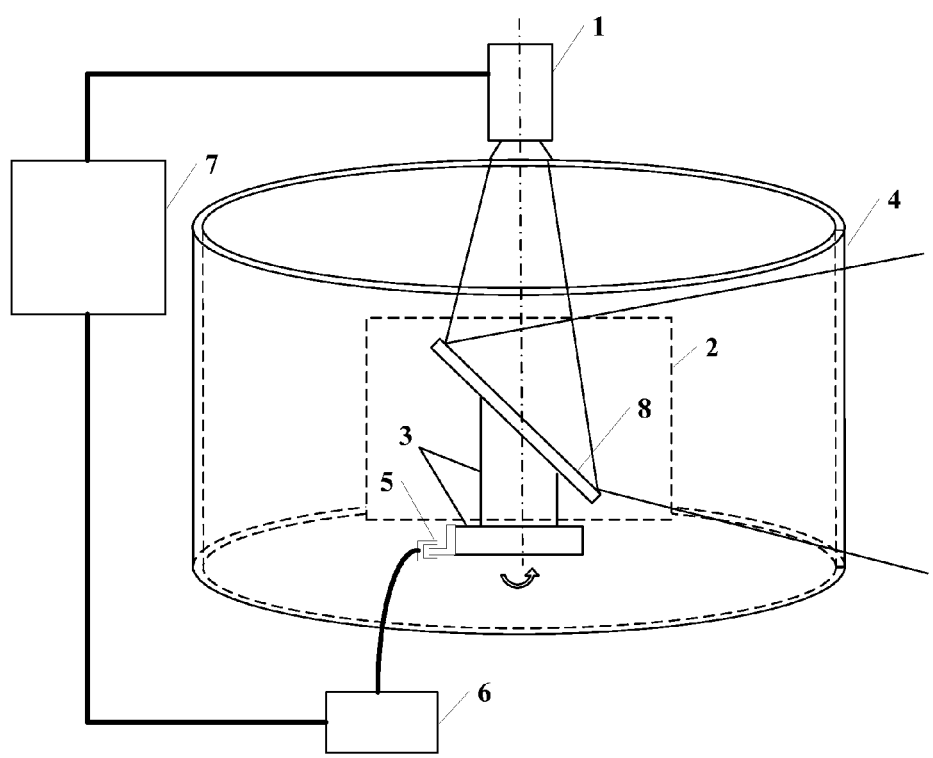
FIG. 2 is a structural diagram of the omnidirectional-view three-dimensional display apparatus presented in another embodiment according to this invention.

Another kind of omnidirectional-view three-dimensional display apparatus shown in FIG. 2 is in accordance with another embodiment of this invention, comprising a high-frame-rate projector 1, a first reflector system 2, a rotary actuator 3, a circular cylindrical transmissive selective-diffusing screen 4, a sensor 5, a rotation synchronization detection module 6 and an upper computer 7. The rotary actuator 3 is installed inside the circular cylindrical transmissive selective-diffusing screen 4, and the first reflector system 2 is attached to the rotary actuator 3. The high-frame-rate projector 1 is arranged at the corresponding position of the first reflector system 2, and the rotary actuator 3 is equipped with the sensor 5. The sensor 5, the synchronous detection module 6, the upper computer 7 and the high-frame-rate projector 1 are serially connected. The first reflector system 2 is located at the inner side of the circular cylindrical transmissive selective-diffusing screen 4 and rotates with the rotary actuator 3. The upper computer 7 acquires images of the modeled three-dimensional object within horizontal 360° view angles and processes them for applicable display.

The high-frame-rate projector 1 sequentially projects the processed synthesized images on the first reflector system 2 which rotates at a high speed, and after the turning of light paths by the first mirror 8 of the first reflector system 2, the images are sequentially projected on the various positions of the circular cylindrical transmissive selective-diffusing screen 4, to meet the observation demand of different views. The three-dimensional image for the 360° omnidirectional-view refreshes once as the first reflector system 2 makes one rotation. Thus, the faster the first reflector system 2 rotates, the more stable the obtained three-dimensional image becomes. Generally, when the rotary actuator makes 15 rotations per second, the refresh frequency also reaches 15 Hz, and the flickers of the displayed three-dimensional image decreases, making the display more stable. This type of three-dimensional display employs fixed circular cylindrical transmissive selective-diffusing screen 4, which can be a transmissive holographic selective-diffusing screen, a binary optical element or an optical element with a grating structure. The screen limits the beam angle of light: in the vertical direction, the light goes through and then scatters in a certain angle, whereas in the horizontal direction, the light is directly transmitted, ensuring that at each viewing angle in the horizontal direction, only the image for this view can be seen. The more available viewing angles are set for the displayed image, the more vivid and subtle the displayed three-dimensional images are. The sensor 5 is a photoelectric sensor or a mechanical limit switch. The rotation synchronization detection module 6 utilizes Single-Chip Microcomputer (SCM), CPLD, FPGA or other programmable logic controller as its main controller. The sensor 5 detects the speed and position of the rotary actuator, and transforms the mechanical or light signals into electrical signals, which are received and processed by the rotation synchronization detection module 6, and then are transmitted to the upper computer 7 through a communication interface (e.g., a serial port). The upper computer 7 processes the information such as the rotary speed and initial position, and controls the high-frame-rate projector 1, so as to make its image refreshing frame rate match the rotary speed of the first reflector system 2, therefore to achieve the synchronization between the image and the rotation, and to identify the display position of the whole image and ensure the stability of the displayed three-dimensional images.

Figure 3:
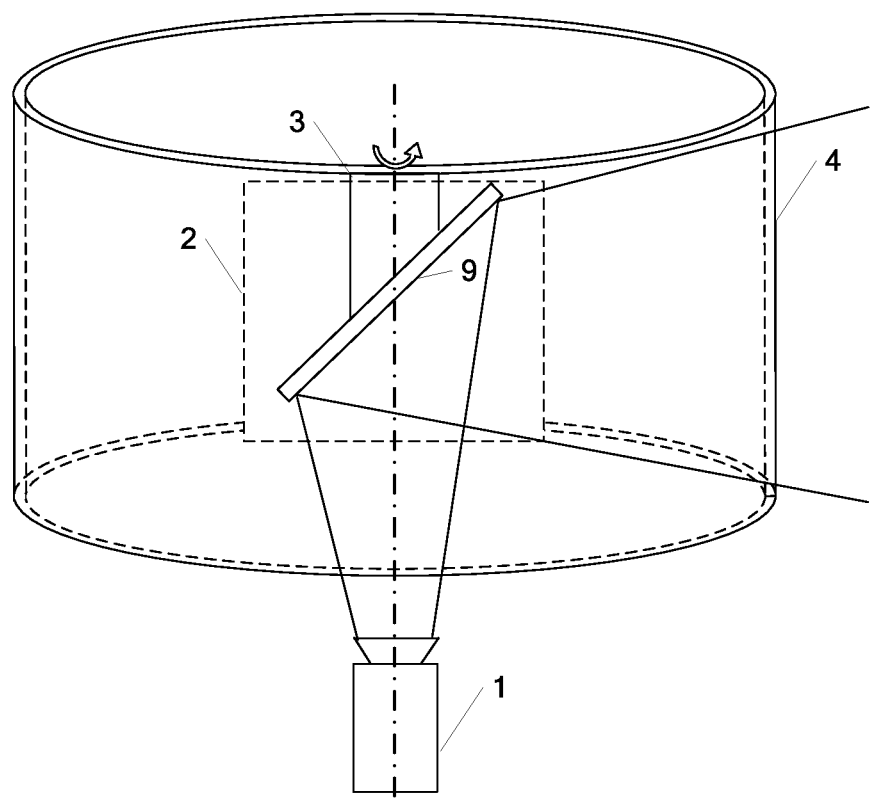
FIG. 3 is a structural diagram of the omnidirectional-view three-dimensional display apparatus presented in still another embodiment according to this invention.

According to another embodiment as shown in FIG. 3, the high-frame-rate projector 1 of the omnidirectional-view three-dimensional display apparatus may also be placed at the bottom of the system. The high-frame-rate projector 1 projects the synthesized images processed by the upper computer 7 on the second mirror 9 of the first reflector system 2 rotating at a high speed from the bottom to the top, and after the turning of light paths, the images are projected on the fixed circular cylindrical transmissive selective-diffusing screen 4. The high-speed rotation of the first reflector system 2 guarantees the refreshment of the 360° omnidirectional-view three-dimensional images in horizontal direction. A variety of installation methods enable the omnidirectional-view three-dimensional display apparatus to be applied in different environment and scenarios.

The first reflector system 2 consists of one or more first reflecting mirror (s) 8, which are installed on the rotary actuator 3 at the same inclined angle to the rotating axis. In case of more than three of first reflecting mirrors 8, the first reflector system 2 is in the shape of polygonal pyramid.

Figure 4:
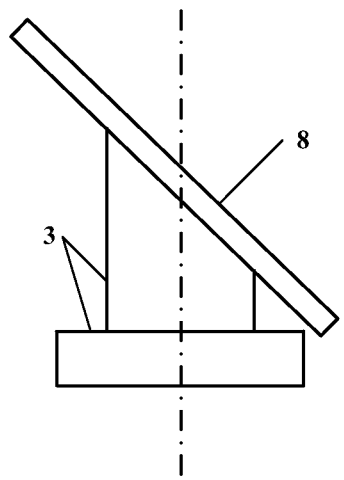
FIG. 4 is a structural diagram of the first reflector system with a single reflecting surface in an embodiment according to this invention.

As shown in FIG. 4, the first reflector system 2 has a single surface reflecting mirror structure. The first reflecting mirror 8 is installed at an inclined angle on the rotary actuator 3 and rotates with it. This method allows the high-frame-rate projector 1 to project a synthesized image corresponding to single viewing angle, which is reflected by the reflecting mirror with a single reflecting surface to display on the circular cylindrical transmissive selective-diffusing screen 4. As the first reflector system 2 rotates one circle, the 360° omnidirectional-view in the horizontal direction is refreshed once.

Figure 5:
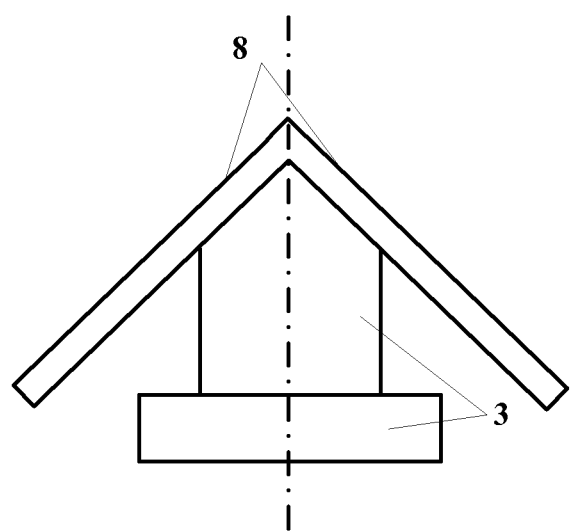
FIG. 5 is a structural diagram of the first reflector system with two reflecting surfaces in another embodiment according to this invention.

As shown in FIG. 5, the first reflector system 2 has a two-surface reflecting mirror structure. Two of the first reflecting mirrors 8 are installed on the rotary actuator 3 at an inclined angle centrosymmetrically around the rotating axis of the rotary actuator 3, and two reflecting surfaces of the first reflecting mirrors 8 are tilting in the same angle to the rotating axis. According to this method, an image projected by the high-frame-rate projector 1 is the combination of two original projected images whose viewing angle difference is 180°, that is, two images with two viewing angles in 180° interval are simultaneously projected on the circular cylindrical transmissive selective-diffusing screen 4. Thus, once the first reflector system 2 makes a half rotation, i.e., rotates 180°, 360° omnidirectional-view in the horizontal direction is refreshed once.

Figure 6:
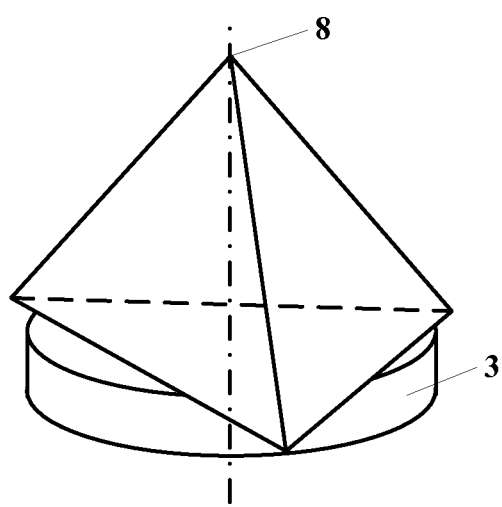
FIG. 6 is a structural diagram of the first reflector system with triple reflecting surfaces in still another embodiment according to this invention.

As shown in FIG. 6, the first reflector system 2 has a three-surface reflecting mirror structure. Three of the first reflecting mirrors 8 are installed on the rotary actuator 3 at an inclined angle and in the shape of triangular pyramid centrosymmetrically around the rotating axis of the rotary actuator 3, and three reflecting surfaces of the first reflecting mirrors 8 are tilting in the same angle to the rotating axis. According to this method, an image projected by the high-frame-rate projector 1 is the combination of three original projected images with three viewing angles in 120° interval, that is, three images with viewing angles of 120° interval are simultaneously projected on the circular cylindrical transmissive selective-diffusing screen 4. Thus, once the first reflector system 2 makes a ⅓ rotation, i.e., rotates 120°, 360° omnidirectional-view in the horizontal direction refreshes once. With the increase in the number of the reflecting mirrors of the first reflector system 2, the number of the rotation circles of the rotary actuator to realize a refreshment of omnidirectional-view decreases. Assuming that the first reflector system 2 consists of n (n≥1) reflecting mirrors, at a given rotary speed, the image refresh frequency of the first reflector system 2 with n reflecting surfaces is n times of that of the first reflector system 2 with a single reflecting surface. Actually, the first reflector system 2 with multiple reflecting surfaces can effectively improve the refresh frequency of the image as well as reduce the mechanical difficulty caused by high-speed rotation of the rotary actuator.

Figure 7:
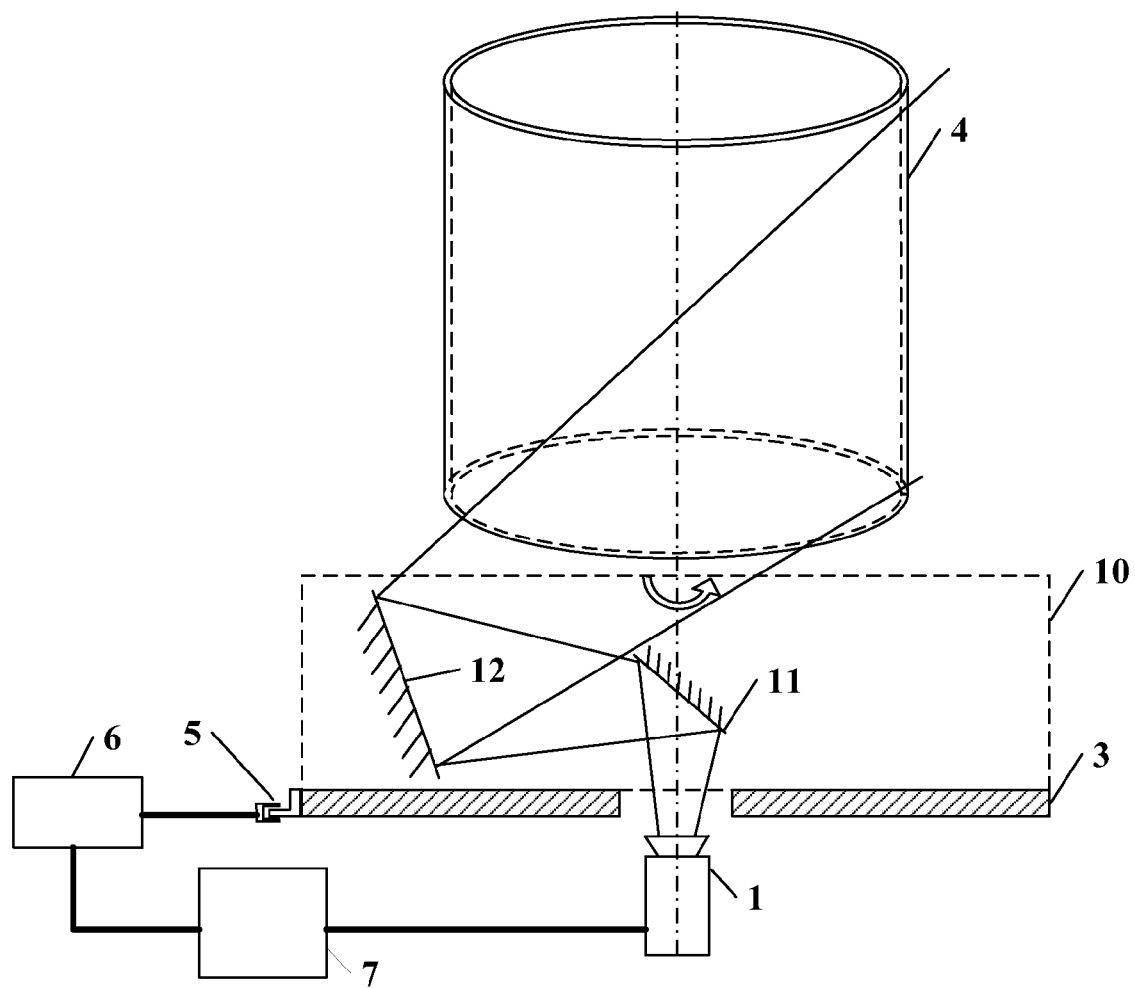
FIG. 7 is a structural diagram of the omnidirectional-view three-dimensional display apparatus in still another embodiment according to this invention.

According to still another embodiment of the present invention as shown in FIG. 7, the omnidirectional-view three-dimensional display apparatus comprises a high-frame-rate projector 1, a second reflector system 10, a rotary actuator 3, a circular cylindrical transmissive selective-diffusing screen 4, a sensor 5, a rotation synchronization detection module 6 and an upper computer 7. The rotary actuator 3 is equipped with a second reflector system 10, and the high-frame-rate projector 1 and the circular cylindrical transmissive selective-diffusing screen 4 are respectively arranged on two sides of the second reflector system 10. The rotary actuator 3 is equipped with the sensor 5. The sensor 5, the rotation synchronization detection module 6, the upper computer 7 and the high-frame-rate projector 1 are sequentially connected. The second reflector system 10 is located above or below the circular cylindrical transmissive selective-diffusing screen 4 and rotates along with the rotary actuator 3. The upper computer 7 acquires images of multiple views of the previously modeled three-dimensional object within horizontal 360° view angles and processes them to adapt to the display system for display. The high-frame-rate projector 1 sequentially projects the processed synthesized images on the second reflector system 10 which rotates at a high speed, and after the turning of light paths by the third reflector 11 and the fourth reflector 12 of the second reflector system 10, the images are sequentially projected on the various positions of the circular cylindrical transmissive selective-diffusing screen 4, to meet the observation demand of different viewing angles. The high-frame-rate projector 1 and the second reflector system 10 may be placed on the top or bottom of the apparatus, any of which can make the image be projected on the circular cylindrical transmissive selective-diffusing screen 4. Similarly, according to this method, the high-frame-rate projector 1 and the circular cylindrical transmissive selective-diffusing screen 4 are fixed parts, whereas the second reflector system 10 is a rotary part. Fewer rotary parts lead to easier operation. The three-dimensional display employs circular cylindrical transmissive selective-diffusing screen 4. The screen limits the beam angle of light: in the vertical direction, the light goes through and then scatters, whereas in the horizontal direction, the light is directly transmitted, ensuring that at each viewing angle in the horizontal direction, only the image for this view can be seen. Serving the function of reflecting an image projected by the fixed high-frame-rate projector 1 and projecting it on the circular cylindrical transmissive selective-diffusing screen 4, the second reflector system 10 includes a third reflector 11 and a fourth reflector 12. The third reflector 11 is a mirror or a reflecting prism, and the fourth reflector 12 is one or more mirrors or reflecting prisms or a combination of mirrors and reflecting prisms. The second reflector system 10 implements the refreshment of the three-dimensional image on the omnidirectional views by rotation. The higher the rotary speed of the second reflector system 10 is, the more stable the displayed three-dimensional image is. The sensor 5 detects the speed and position of the rotary actuator, and transforms the mechanical or light signals into electrical signals, which are received and processed by the rotation synchronization detection module 6, and then are transmitted to the upper computer 7 through a communication interface (e.g., a serial port). The upper computer 7 processes the information of the rotary speed and initial position, and controls the high-frame-rate projector 1, so as to achieve the synchronization between the image and the rotation. Therefore, the display position of the whole image is identified to ensure the stability of the displayed three-dimensional image. In the aforesaid embodiment, the second reflector system 10 only includes two mirrors, the third reflector 11 and the fourth reflector 12, but the invention is not limited to that. One of ordinary skills in the art knows that there are many kinds of substitution for the second reflector system 10, that is, multiple mirrors can be used in order to change the light path for projection.

Figure 8:
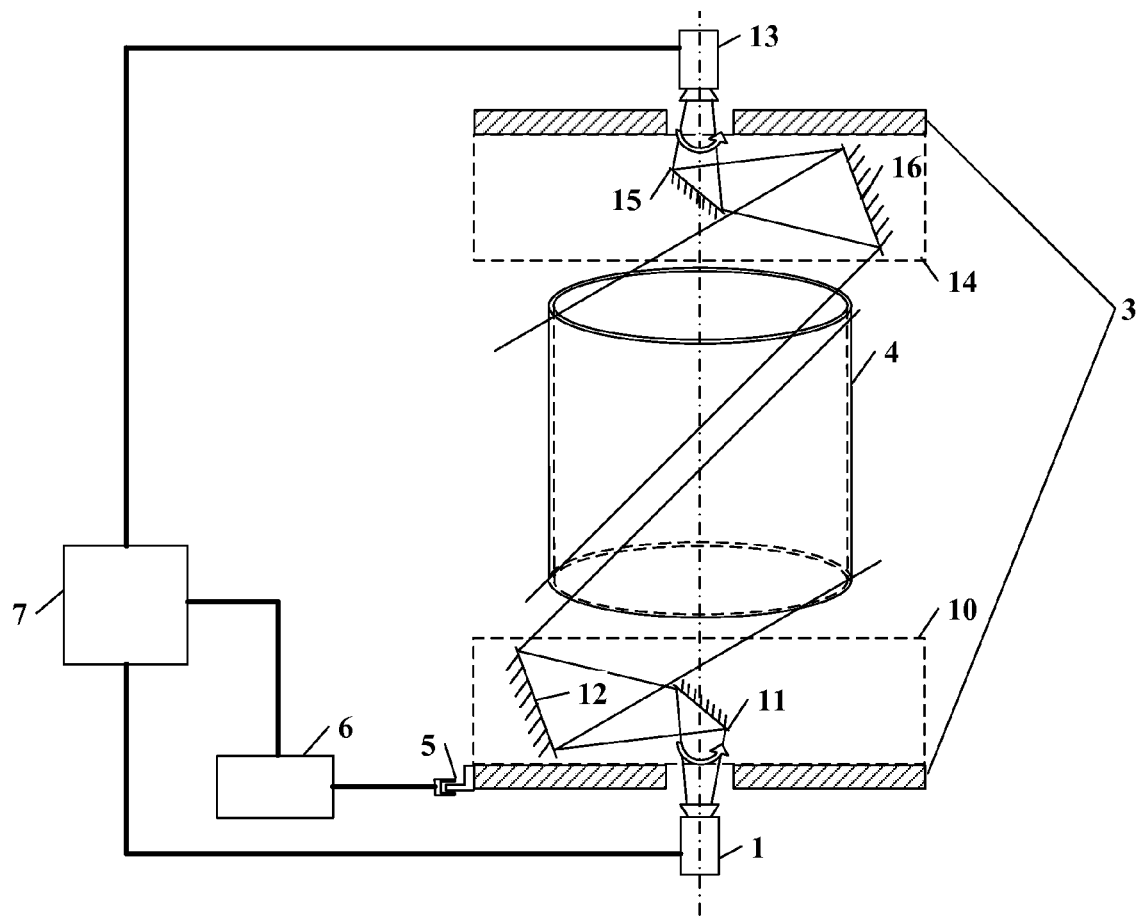
FIG. 8 is a structural diagram of the omnidirectional-view three-dimensional display apparatus presented in still another according to this invention.

According to still another embodiment of the present invention as shown in FIG. 8, the omnidirectional-view three-dimensional display apparatus comprises high-frame-rate projectors 1 and 13, a second reflector system 10, a third reflector system 14, rotary actuators 3, a circular cylindrical transmissive selective-diffusing screen 4, a sensor 5, a rotation synchronization detection module 6 and an upper computer 7. The second reflector system 10 and the third reflector system 14 are installed respectively on two rotary actuators 3, and the circular cylindrical transmissive selective-diffusing screen 4 is located between the second reflector system 10 and the third reflector system 14. The high-frame-rate projectors 1 and 13 are arranged corresponding to the two rotary actuators 3 which are equipped with the sensor 5. The sensor 5, the synchronization detection module 6 and the upper computer 7 are sequentially connected. The upper computer 7 is respectively connected to the high-frame-rate projectors 1 and 13. The high-frame-rate projectors 1 and 13 are located at the top and bottom of the system. The high-frame-rate projector 1 projects the synthesized images processed by the upper computer 7 from the upper center of the rotating axis, which is first reflected by the third reflector 11 of the second reflector system 10 and then reflected by the fourth reflector 12 to project on the circular cylindrical transmissive selective-diffusing screen 4. Meanwhile, the high-frame-rate projector 13 projects the synthesized images processed by the upper computer 7 from the lower center of the rotating axis, which first goes through the fifth reflector 15 of the third reflector system 14 and then is reflected by the sixth reflector 16 to project on the circular cylindrical transmissive selective-diffusing screen 4. The image projected by high-frame-rate projector 1 on the circular cylindrical transmissive selective-diffusing screen 4 differs from the image by the high-frame-rate projector 13 in 180° horizontally. At a given time, two images with two viewing angles in 180° interval are projected on the circular cylindrical transmissive selective-diffusing screen 4 at the same time. With the synchronous high-speed rotation of the second reflector system 10 and the third reflector system 14 driven by the rotary actuators 3, the refreshment of the omnidirectional-view can be achieved. The second reflector system 10 includes the third reflector 11 and the fourth reflector 12. The third reflector 11 is a mirror or a reflecting prism, and the fourth reflector 12 is one or more mirrors or reflecting prisms or a combination of mirrors and reflecting prisms. The third reflector system 14 includes the fifth reflector 15 and the sixth reflector 16. The fifth reflector 15 is a mirror or a reflecting prism, and the sixth reflector 16 is one or more mirrors or reflecting prisms or a combination of mirrors and reflecting prisms. The second reflector system 10 and the third reflector system 14 are mainly designed to reflect images projected by the fixed high-frame-rate projectors 1 and 13 respectively and project them on the corresponding positions of the circular cylindrical transmissive selective-diffusing screen 4. Compared with using a single high-frame-rate projector, by this method, the system only needs to rotate half a circle to refresh the 360° omnidirectional view of three-dimensional image. At the same rotary speed, the refresh frequency of three-dimensional image of the system with two high-frame-rate projectors is twice of that of the system with a single high-frame-rate projector. Undoubtedly, this method improves image refresh frequency as well as display stability and reduces the mechanical difficulty arising from high-speed rotation of the rotary actuator. This apparatus requires the rotation synchronization detection module 6 to detect the rotary speed and position of the rotary actuator, and also requires the upper computer 7 to control the high-frame-rate projectors 1 and 13, to ensure the synchronization between the rotation of the system and the display of the three-dimensional image, to identify the display position of the three-dimensional image and guarantee the stability for displaying the three-dimensional image.

Figure 9:
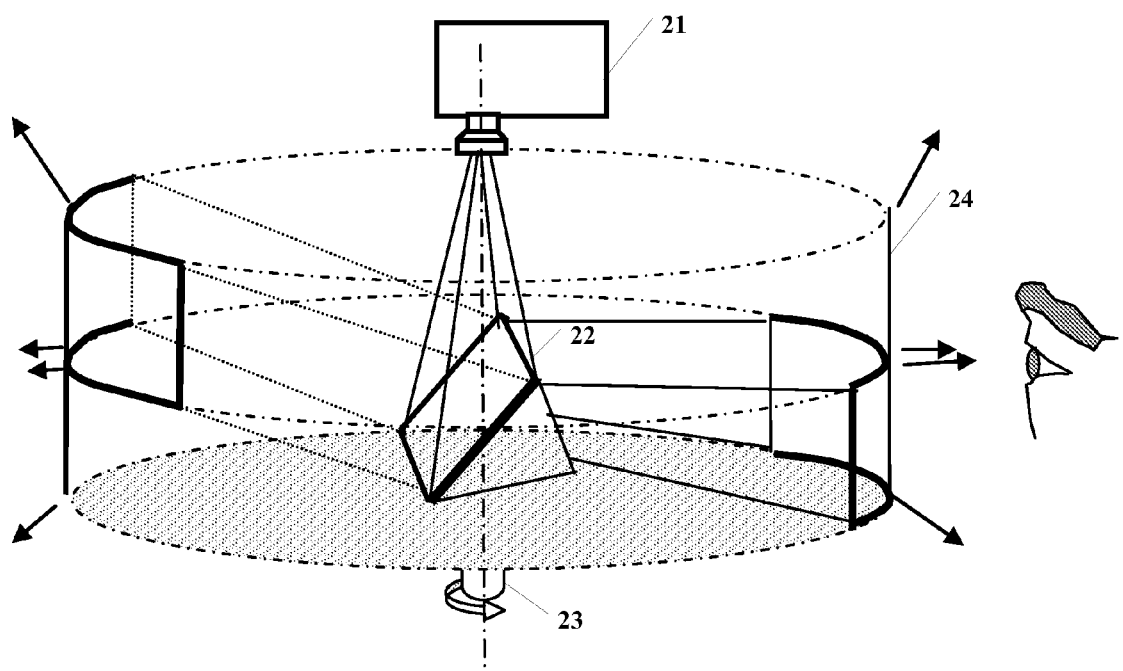
FIG. 9 is an illustration of 3D display schematic of the omnidirectional-view three-dimensional display apparatus simultaneously having the horizontal all round and multiple top/bottom vertical views in one embodiment according to this invention.

As shown in FIG. 9, an omnidirectional-view three-dimensional display apparatus simultaneously having horizontal all-round and multiple top/bottom vertical views is provided according to one embodiment of this invention. The apparatus mainly comprises a fixed high-frame-rate projector 21 and transmissive selective-diffusing screen 24, and a fourth reflector system 22 as a rotary part which is installed on a rotary actuator 23 and rotates with it. The high-frame-rate projector 21 is at the top of the apparatus. The rotary fourth reflector system 22 is correspondingly installed below the projector. The fixed transmissive selective-diffusing screen 24 is at the outer side of the fourth reflector system 22. By limiting the divergence angle of emergent light incident from different directions, the fixed transmissive selective-diffusing screen 24 achieves the omnidirectional-view three-dimensional display simultaneously having the horizontal all-round and multiple top/bottom vertical views. The computer processes and synthesizes the images of each view within 360° of horizontal directions for viewpoints at different heights in advance, and then transmits them to the high-frame-rate projector 21 for display. The high-frame-rate projector 21 sequentially projects such processed and synthesized images, which are subject to light division and reflection by the fourth reflector system 22 and then are projected to a circular zonary view at different heights for the omnidirectional-view three-dimensional display for different top/bottom vertical views. To prevent the mixing and overlapping of the images, the divided images are free of axial superposition on the cylindrical transmissive selective-diffusing screen. Further, the divided images are connected in an axial direction on the cylindrical transmissive selective-diffusing screen, forming an image of a larger size. When the fourth reflector system 22 is driven by the rotary actuator 23 to rotate, the refreshment of views in 360 degrees horizontally is realized.

Figure 10:
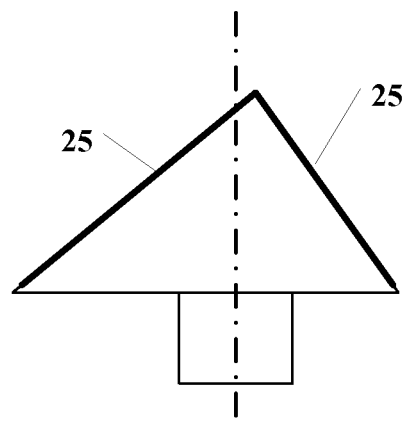
FIG. 10 is a structural diagram of the fourth reflector system with a single-layer structure applied in an embodiment according to this invention.

As shown in FIG. 10, the fourth reflector system 22 may consist of two pieces of the seventh mirrors 25, which tilts at different angles to the rotating axis to satisfy the demand of two circular zonary views at different heights. As the fourth reflector system 22 rotates one circle, the three-dimensional image completes the refreshment for two top/bottom vertical views in 360 degrees horizontally of the omnidirectional view. Hence, the faster the rotary speed of the fourth reflector system 22 is, the more stable the three-dimensional image on the transmissive selective-diffusing screen 24 becomes. Generally, when the rotary actuator 23 makes 15 rotations, the refresh frequency also reaches 15 Hz. It decreases the flickers of displayed three-dimensional image, and makes the display more stable. In the whole apparatus, the frame rate of the high-frame-rate projector 21 shall match with the rotary speed of the system. Assuming that there are n (where n is an integral number and n>10) horizontal views in one circle, and the frame rate of the high-frame-rate projector 21 is v frames/second, and the rotary speed of the rotary actuator 23 is ω rotation/second, so they satisfy the following equation: $v=\omega \cdot n$. Only if the relationship of the above equation is satisfied, the system can achieve the synchronization between the rotation and projection as well as can identify the orientations of three-dimensional scene, so that the three-dimensional image on the transmissive selective-diffusing screen 24 can be stable. Surely, the system may be upside down with the projector 21 projecting image upward, and the omnidirectional-view three-dimensional display simultaneously having horizontal all round and multiple top/bottom vertical views can be implemented as well. A variety of installation methods enables the apparatus to be applied in different environment and scenarios.

According to an embodiment of this invention, the fourth reflector system 22 is a single-layer structure, consisting of a plurality of pieces of the seventh mirrors 25, which tilts at various angles to the rotating axis. The image projected by the high-frame-rate projector 21 are reflected by the seventh mirrors 25 at various angles, then are projected to circular zonary views at different heights on the transmissive selective-diffusing screen 24. The fourth reflector system 22 is mounted on the rotary actuator 23 and rotates with it. The rotating axis of the rotary actuator 23 and the center of the fourth reflector system 22 are not necessarily superposition. Assuming that the fourth reflector system 22 consists of n (n is an integer and n≥2) pieces of the seventh mirrors 25 with different tilting angles to the rotating axis, then corresponding to n different top/bottom vertical views, the refresh frequency of the three-dimensional image equals to the rotary speed of the rotary actuator 23. When some seventh mirrors 25 of the fourth reflector system 22 are tilted at the same angle to the rotating axis, the images projected by such seventh mirrors 25 to the transmissive selective-diffusing screen 24 correspond to the same circular zonary view. On the other hand, the images projected by the seventh mirrors 25 with different tilting angles to the rotating axis correspond to circular zonary views at different heights. Through this means, the omni-directional three-dimensional display with both the 360° horizontal views and multiple top/bottom vertical views is achieved.

Figure 11:
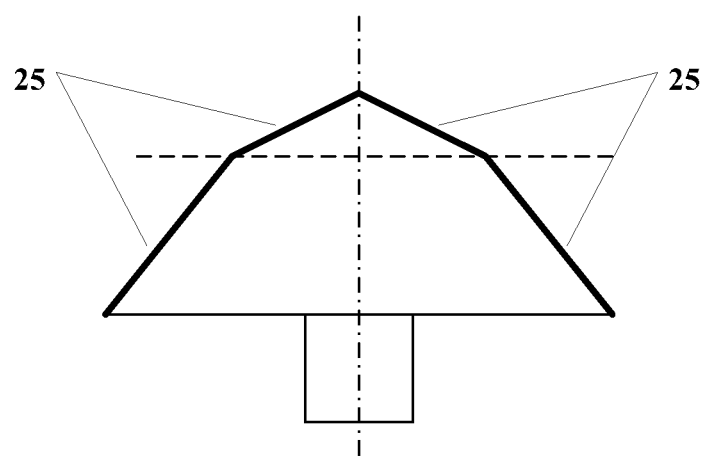
FIG. 11 is a structural diagram of the fourth reflector system with a multiple-layer structure applied in another embodiment according to this invention.

As shown in FIG. 11, the fourth reflector system 22 is a multiple-layer structure, wherein each layer consists of several pieces of the seventh mirrors 25 and each seventh mirror 25 in the same layer has the same tilting angle to the rotating axis, and different layers are corresponding to different circular zonary views. The fourth reflector system 22 is symmetrical in structure and every layer of the fourth reflector system 22 corresponds to a circular zonary view. The images projected by the high-frame-rate projector 1 are reflected by the same layer of the fourth reflector system 22 and then are projected to the same top/bottom vertical circular zonary view. The multiple top/bottom vertical views are realized by multiple layers tilting at different angles to the rotating axis in the seventh mirror 25.

Figure 12:
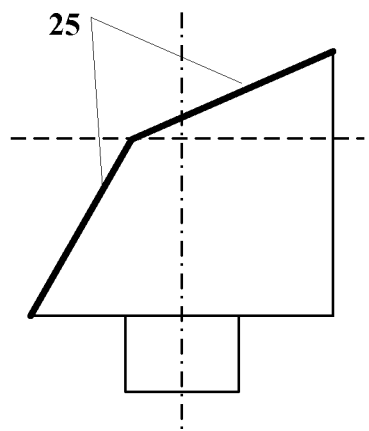
FIG. 12 is a structural diagram of the fourth reflector system with another kind of multiple-layer structure applied in still another embodiment according to this invention.

As shown in FIG. 12, the fourth reflector system 22 is a multiple-layer structure, wherein each layer consists of one piece of the seventh mirrors 25 and each seventh mirror 25 has a different tilting angle to the rotating axis. By this way, the omnidirectional-view three-dimensional display with multiple top/bottom vertical views can be achieved as well. The rotation speed of the rotary actuator 23 is equal to the refreshing frequency of the three-dimensional image. Assuming that the fourth reflector system 22 consists of m (m is an integer and m≥2) layers, each layer consists of n (n is an integer and n≥1) pieces of the seventh mirrors 25, there will be m different corresponding top/bottom vertical views for the 3D image, and the refreshing frequency of the 3D image will be n times of the rotation speed of the rotary actuator 23. At a given rotation speed, the symmetrical structure both improves the refreshing frequency of the 3D image and makes the rotation more balanced and stable.

Figure 13:
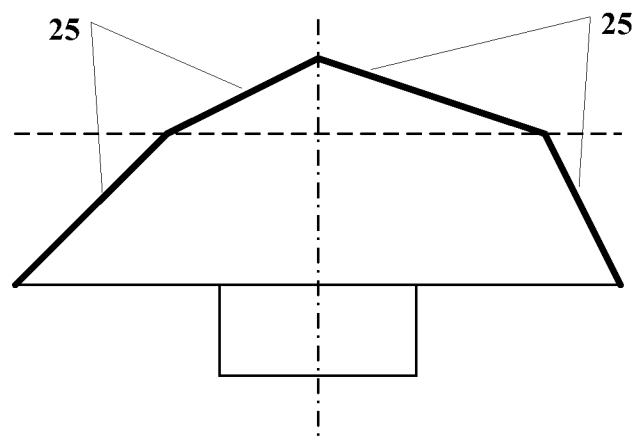
FIG. 13 is a structural diagram of the fourth reflector system with the other kind of multiple-layer structure applied in still another embodiment according to this invention.

As shown in FIG. 13, the fourth reflector system 22 is a multiple-layer structure, wherein each layer consists of several pieces of the seventh mirrors 25 and each seventh mirror 25 of the same layer has a different tilting angle to the rotating axis. Mirrors with the different tilting angles to the rotating axis correspond to different circular zonary views. This structure is asymmetrical, and those of the seventh mirrors 25 that meet the rotating axis in the same angle correspond to the circular zonary view in the same direction, there is the corresponding image with multiple top/bottom vertical views for observers at different heights.

Figure 14:
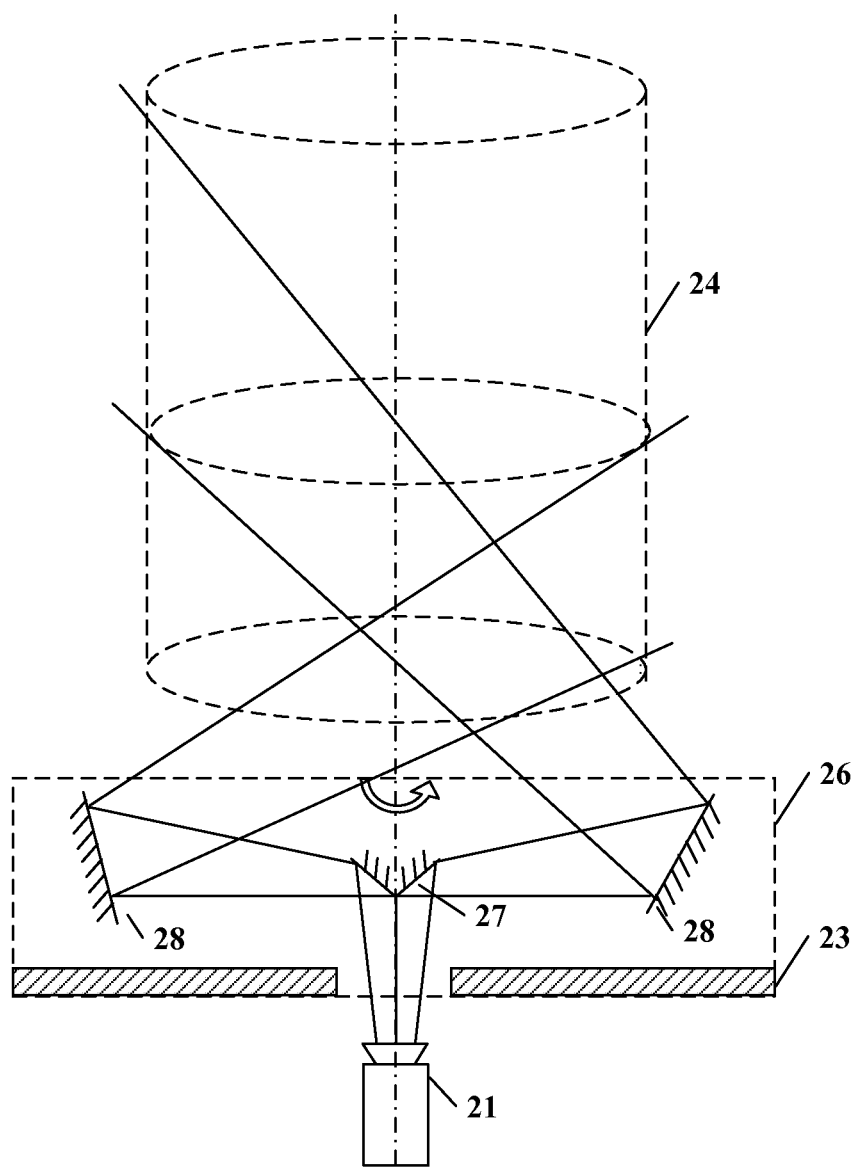
FIG. 14 is a structural diagram of the omnidirectional-view three-dimensional display apparatus simultaneously having the horizontal all round and multiple top/bottom vertical views presented in another embodiment according to this invention.

As shown in FIG. 14, the present invention provides another omnidirectional-view three-dimensional display apparatus simultaneously having the horizontal and multiple top/bottom vertical views, which comprises a high-frame-rate projector 21, a fifth reflector system 26, a rotary actuator 23 and a transmissive selective-diffusing screen 24. The fifth reflector system 26 is mounted on the rotary actuator 23 and rotates with it. The high-frame-rate projector 21 and the transmissive selective-diffusing screen 24 are arranged on two sides of the fifth reflector system 26, respectively. The fifth reflector system 26 contains the first reflector group 27 at the center of the fifth reflector system 26, and the second reflector group 28 at the outer side of the fifth reflector system 26. Both the first reflector group 27 and the second reflector group 28 can be a single layer or multiple layers in structure, each of which has several pieces of mirrors, or reflecting prisms, or a combination of mirrors and reflecting prisms.

The computer processes and synthesizes the images of each view within 360° of horizontal directions for viewpoints at different heights, and then transmits them to the high-frame-rate projector 21 for display. The high-frame-rate projector 21 sequentially projects such processed and synthesized images, which is divided by the first reflector group 27 of the fifth reflector system 26 and reflected by the second reflector group 28, and then is projected to circular zonary views in 180° interval horizontally at different heights for the omnidirectional-view three-dimensional display with different top/bottom vertical views. To prevent the mixing and overlapping of the images, the divided images are free of radial and/or axial superposition on the cylindrical transmissive selective-diffusing screen. Furthermore, the divided images are connected in radial and/or axial direction on the cylindrical transmissive selective-diffusing screen, forming an image of a larger size. When the fifth reflector system 26 is driven by the rotary actuator 23 to rotate along with it, the refreshment of 360° omnidirectional view in the horizontal direction is achieved. Hence, the faster the rotation speed of the fifth reflector system 26 is, the more stable the three-dimensional image becomes. Similarly, this structure also requires the synchronization between the rotation and projection to ensure the stability of displayed three-dimensional image. The high-frame-rate projector 21 may be mounted at the bottom of the apparatus, projecting upward; or at the top of the apparatus, projecting downward. In this structure, the rotary part is separated from the projected screen and no any rotary part is inside the transmissive selective-diffusing screen 24, which is easy to install and is applicable to different scenarios.

Figure 15:
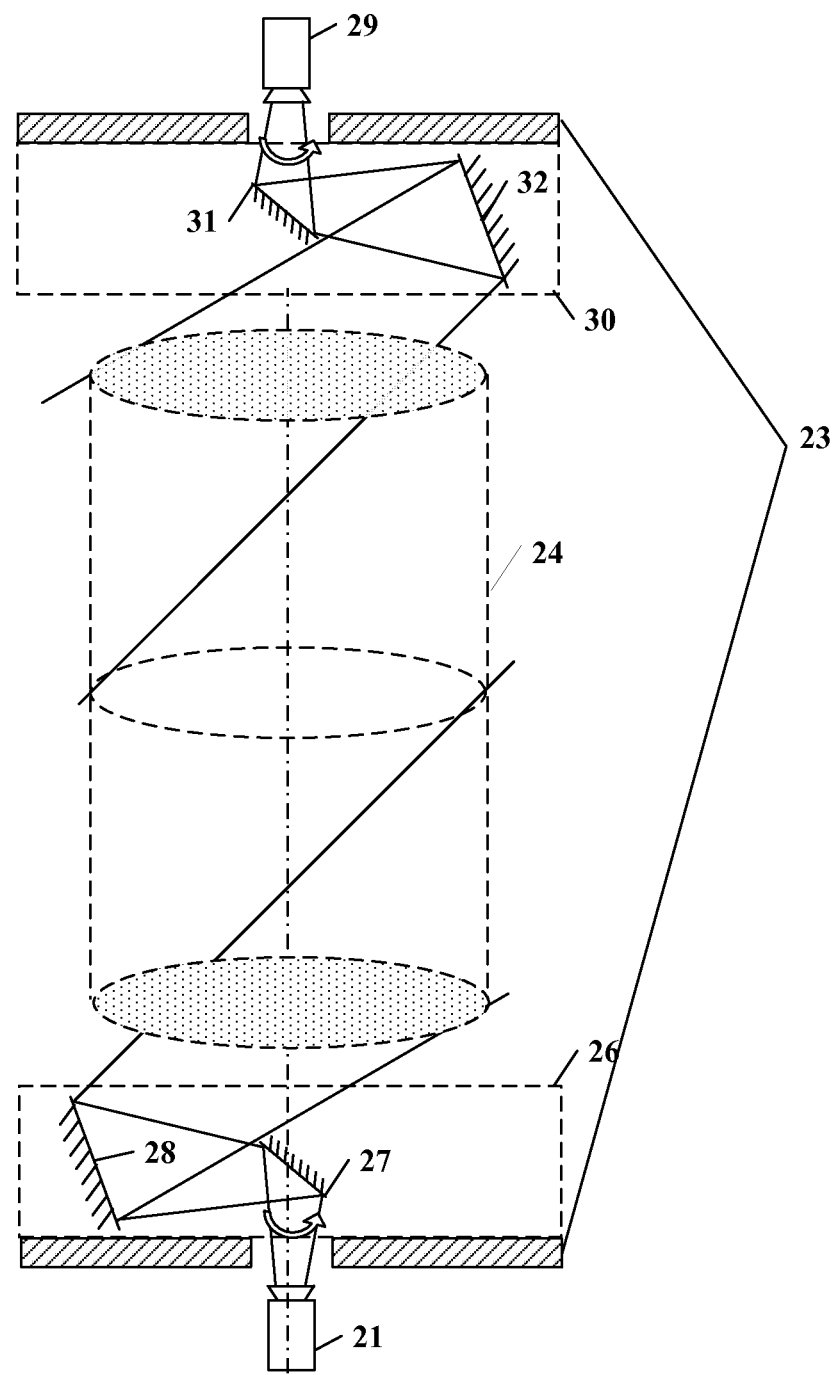
FIG. 15 is a structural diagram of the omnidirectional-view three-dimensional display apparatus simultaneously having the horizontal all round and multiple top/bottom vertical views presented in the other embodiment according to this invention.

As shown in FIG. 15, the other omnidirectional-view three-dimensional display apparatus simultaneously having the horizontal all round and multiple top/bottom vertical views is provided according to the present invention, which comprises high-frame-rate projectors 21 and 29, a fifth reflector system 26, a sixth reflector system 30, rotary actuators 23 and a transmissive selective-diffusing screen 24. Two rotary actuators 23 are respectively equipped with the fifth reflector system 26 and the sixth reflector system 30. The transmissive selective-diffusing screen 24 is arranged between the fifth reflector system 26 and the sixth reflector system 30. The high-frame-rate projectors 21 and 29 are respectively arranged at the positions corresponding to two rotary actuators 23. The fifth reflector system 26 contains the first reflector group 27 and the second reflector group 28, while the sixth reflector system 30 includes the third reflector group 31 and the fourth reflector group 32. All these reflector groups (27, 28, 31, 32) can be a single layer or multiple layers in structure, each of which has several pieces of mirrors, or reflecting prisms, or a combination of mirrors and reflecting prisms.

The high-frame-rate projector 21 is located at the bottom of the apparatus, projecting upward; while the high-frame-rate projector 29 is arranged at the top of the apparatus, projecting downward. The high-frame-rate projector 21 projects the synthesized images processed by the computer from the center of the rotating axis upward, which firstly goes through the first reflector group 27 of the fifth reflector system 26, and then is reflected by the second reflector group 28 to project on the transmissive selective-diffusing screen 24. Meanwhile, the high-frame-rate projector 29 projects the synthesized images processed by the computer from the center of the rotating axis downward, which firstly goes through the third reflector group 31 of the sixth reflector system 30 and is then reflected by the fourth reflector group 32 to project on the transmissive selective-diffusing screen 24. The images projected by high-frame-rate projectors 21 and 29 are projected on zones at different heights of the screen for various top/bottom vertical views. To prevent the mixing and overlapping of the images, they are free of radial and/or axial superposition on the cylindrical transmissive selective-diffusing screen. Furthermore, the divided images are connected in radial and/or axial direction on the cylindrical transmissive selective-diffusing screen, forming an image of a larger size. The refreshment of the 360° omnidirectional view in horizontal direction is realized by rotation of the fifth reflector system 26 and the sixth reflector system 30 driven by the rotary actuators 23. At a given rotation speed, 3D image refreshing frequency of the apparatus with two high-frame-rate projectors is twice of that of the apparatus with a single high-frame-rate projector, which surely improves the refreshing frequency and stability of the displayed image. Certainly, this method also demands the match between the system rotation and the frame rate of the projector to identify the display position of the three-dimensional image and guarantee the stability for displaying the three-dimensional image.

The transmissive selective-diffusing screen 24 in the aforesaid embodiments can be a transmissive holographic selective-diffusing screen, a binary optical element or optical elements with other grating structure.

Figure 16:
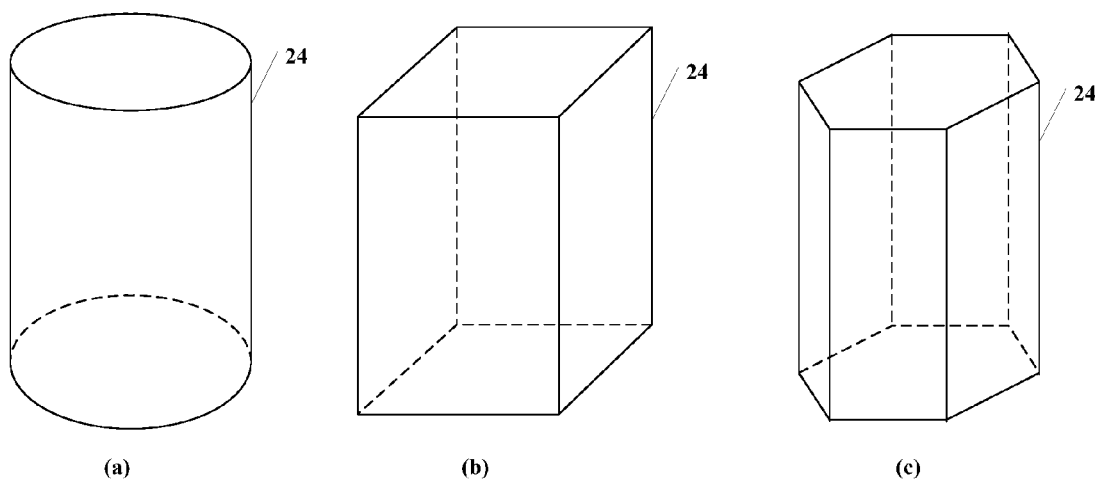
FIG. 16(a) is a structural diagram of circular cylindrical transmissive selective-diffusing screen.
FIG. 16(b) is a structural diagram of quadrangular-prism cylindrical transmissive selective-diffusing screen.
FIG. 16(c) is a structural diagram of hexagonal-prism cylindrical transmissive selective-diffusing screen.

As shown in FIG. 16, the radial cross-section of the transmissive selective-diffusing screen 24 can be the shape of a circle, a triangle, a quadrilateral or a polygon. The transmissive selective-diffusing screen 24 limits the beam angle of light: in the vertical direction, the light is forced to go through and emit in a certain angle whereas in the horizontal direction, the light is directly transmitted at a small angle, ensuring that at each view angle horizontally, only the image for this view can be seen, and different images can be watched in different top/bottom vertical views.

The descriptions of the foregoing embodiments are intended to illustrate and not to limit this invention. Various changes and modifications may be made to the embodiments by any of ordinary skill in the art without departing from the spirit and scope of the invention. Therefore, the scope of the invention is to be defined by the appended claims.

Industrial Applicability

This invention is suitable for industrial application and large-scale production.

The invention claimed is:

1. An omnidirectional-view three-dimensional display apparatus, comprising: a high-frame-rate projector, a rotary actuator, a rotatable reflector device positioned on the rotary actuator, and a cylindrical transmissive selective-diffusing screen, wherein an optical axis of the high-frame-rate projector is coincident with a rotating axis of the reflector device and an axis of the cylindrical transmissive selective-diffusing screen; images projected by the high-frame-rate projector are divided and reflected by the reflector device to form images on the cylindrical transmissive selective-diffusing screen; wherein the cylindrical transmissive selective-diffusing screen limits a divergence angle of emergent light incident from different directions, in such a manner so that: in a vertical direction, the light is forced to go through and emit in a certain angle whereas in a horizontal direction, the light is directly transmitted at another certain angle, ensuring that at each view angle horizontally, only the image for this view can be seen, and different images can be watched in different top/bottom vertical views; wherein the axis of the cylindrical transmissive selective-diffusing screen is the vertical direction.

2. The omnidirectional-view three-dimensional display apparatus according to claim 1, wherein the reflector device is installed inside the cylindrical transmissive selective-diffusing screen and the reflector device consists of n (n is an integer and n≥2) pieces of mirrors with different tilting angles to the rotating axis, corresponding to n different top/bottom vertical views, and refresh frequency of three-dimensional image equals to rotary speed of the rotary actuator.

3. The omnidirectional-view three-dimensional display apparatus according to claim 1, further comprising an upper computer, wherein the rotary actuator also includes a sensor for detecting rotary status of the reflector device, and a synchronous detection module, and wherein the sensor, the synchronous detection module, the upper computer and the high-frame-rate projector are sequentially in electrical connection.

4. The omnidirectional-view three-dimensional display apparatus according to claim 3, wherein the rotary actuator is installed inside the cylindrical transmissive selective-diffusing screen.

5. The omnidirectional-view three-dimensional display apparatus according to claim 1, wherein the reflector device includes at least two groups of reflecting surfaces, which divide the image projected by the high-frame-rate projector.

6. The omnidirectional-view three-dimensional display apparatus according to claim 1, wherein the cylindrical transmissive selective-diffusing screen is a transmissive holographic selective-diffusing screen, a binary optical element or an optical element with grating structure.

7. The omnidirectional-view three-dimensional display apparatus according to claim 1, wherein radial cross-section of the cylindrical transmissive selective-diffusing screen is in the shape of a circle, a triangle, a quadrilateral or a polygon.

8. The omnidirectional-view three-dimensional display apparatus according to claim 1, wherein the reflector device is a multiple-vertical-layer structure, wherein each layer consists of several pieces of mirrors and each mirror in the same layer has same tilting angle to the rotating axis, and different layers are corresponding to different circular zonary views.

9. The omnidirectional-view three-dimensional display apparatus according to claim 1, wherein the reflector device is a multiple-vertical-layer structure, wherein each layer consists of several pieces of mirrors and each mirror in the same layer has different tilting angles to the rotating axis correspond to circular zonary views at different heights.

10. The omnidirectional-view three-dimensional display apparatus according to claim 1, wherein the cylindrical transmissive selective-diffusing screen is a binary optical element or an optical element with grating structure.

11. The omnidirectional-view three-dimensional display apparatus according to claim 1, wherein radial cross-section of the cylindrical transmissive selective-diffusing screen is in the shape of a triangle, a quadrilateral or a polygon.

12. The omnidirectional-view three-dimensional display apparatus according to claim 1, wherein there are n (where n is an integral number and n>10) horizontal views in one circle, and a frame rate of the high-frame-rate projector is v frames/second, and rotary speed of the rotary actuator is $\omega$ rotation/second, so they satisfy following equation: $v=\omega \cdot n$.

13. An omnidirectional-view three-dimensional display apparatus, comprising: two sets of high-frame-rate projectors, two rotatable reflector devices respectively positioned on two rotary actuators, and a cylindrical transmissive selective-diffusing screen, wherein an optical axis of the high-frame-rate projectors is coincident with a rotating axis of the reflector devices and an axis of the cylindrical transmissive selective-diffusing screen; images projected by the high-frame-rate projectors are divided and reflected by the reflector devices to form images on the cylindrical transmissive selective-diffusing screen; wherein the cylindrical transmissive selective-diffusing screen limits a divergence angle of emergent light incident from different directions, in such a manner so that: in a vertical direction, the light is forced to go through and emit in a certain angle whereas in a horizontal direction, the light is directly transmitted at another certain angle, ensuring that at each view angle horizontally, only the image for this view can be seen, and different images can be watched in different top/bottom vertical views; wherein the reflector devices are installed inside the cylindrical transmissive selective-diffusing screen; the axis of the cylindrical transmissive selective-diffusing screen is the vertical direction; wherein each of the reflector devices is a multiple-layer structure, wherein each layer consists of several pieces of mirrors and each mirror in the same layer has different tilting angles to the rotating axis correspond to circular zonary views at different heights; wherein said two sets of high-frame-rate projectors and reflector devices are arranged along the axial direction of the cylindrical transmissive selective-diffusing screen, and images projected by different high-frame-rate projectors are free of radial and/or axial superposition on the cylindrical transmissive selective-diffusing screen; wherein images projected by different high-frame-rate projectors are connected in radial and/or axial direction on the cylindrical transmissive selective-diffusing screen.

* * * * *